(12) United States Patent
Choi et al.

(10) Patent No.: US 8,986,863 B2
(45) Date of Patent: Mar. 24, 2015

(54) BATTERY COOLING SYSTEM AND BATTERY RACK APPLIED TO THE SAME

(71) Applicant: LG Chem, Ltd., Seoul (KR)

(72) Inventors: Ji-Young Choi, Yongin-si (KR); Chae-Ho Chung, Daejeon (KR); Bum-Hyun Lee, Seoul (KR); Won Chan Park, Daejeon (KR); Yong-Seok Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 62 days.

(21) Appl. No.: 13/858,343

(22) Filed: Apr. 8, 2013

(65) Prior Publication Data

US 2013/0224537 A1 Aug. 29, 2013

Related U.S. Application Data

(63) Continuation of application No. PCT/KR2012/003865, filed on May 16, 2012.

(30) Foreign Application Priority Data

May 31, 2011 (KR) .................. 10-2011-0052262
May 15, 2012 (KR) .................. 10-2012-0051678

(51) Int. Cl.
| | |
|---|---|
| H01M 6/50 | (2006.01) |
| H01M 10/50 | (2006.01) |
| H01M 10/613 | (2014.01) |
| H01M 10/617 | (2014.01) |
| H01M 10/647 | (2014.01) |
| H01M 10/6563 | (2014.01) |
| H01M 2/10 | (2006.01) |
| H01M 10/6557 | (2014.01) |
| H01M 10/6566 | (2014.01) |
| H01M 10/6562 | (2014.01) |

(52) U.S. Cl.
CPC ........ *H01M 6/5038* (2013.01); *H01M 10/5004* (2013.01); *H01M 10/5008* (2013.01); *H01M 10/5032* (2013.01); *H01M 10/5067* (2013.01); *H01M 2/1077* (2013.01); *H01M 10/5059* (2013.01); *H01M 10/5073* (2013.01); *H01M 10/5065* (2013.01)

USPC .................. 429/71; 429/120; 429/100

(58) Field of Classification Search
None
See application file for complete search history.

(56) References Cited

U.S. PATENT DOCUMENTS

| | | | |
|---|---|---|---|
| 5,589,290 | A | 12/1996 | Klink et al. |
| 2012/0183822 | A1 | 7/2012 | Chung et al. |

FOREIGN PATENT DOCUMENTS

| | | |
|---|---|---|
| DE | 44 07 156 C1 | 6/1995 |
| JP | 2000-294302 A | 10/2000 |
| JP | 2006-100123 A | 4/2006 |
| JP | 2007-26894 A | 2/2007 |
| JP | 2009-277394 A | 11/2009 |
| JP | 2010-114989 A | 5/2010 |
| JP | 2010-232084 A | 10/2010 |
| KR | 10-2005-0007648 A | 1/2005 |
| KR | 10-2005-0035478 A | 4/2005 |
| KR | 10-2009-0062968 A | 6/2009 |
| KR | 10-2010-0061879 A | 6/2010 |
| KR | 10-2011-0019490 A | 2/2011 |

OTHER PUBLICATIONS

International Search Report issued in PCT/KR2012/003865, mailed on Nov. 9, 2012.

*Primary Examiner* — Patrick Ryan
*Assistant Examiner* — Christopher Domone
(74) *Attorney, Agent, or Firm* — Birch, Stewart, Kolasch & Birch, LLP

(57) ABSTRACT

Disclosed is a battery cooling system having a main frame for defining a structure of a battery rack; a space dividing frame for dividing the inside of the main frame into a plurality of levels; a battery module located inside the main frame and supported by the space dividing frame; a pair of refrigerant guide plates respectively installed at the upper and lower ends of the battery module and installed to be inclined in the same direction with predetermined angles with respect to the upper and lower surfaces thereof; and side panels coupled to the sides of the main frame and having a channel slit formed in at least a part thereof.

21 Claims, 6 Drawing Sheets

BATTERY COOLING SYSTEM AND BATTERY RACK APPLIED TO THE SAME

CROSS-REFERENCE TO RELATED APPLICATION

The present application is a continuation of International Application No. PCT/KR2012/003865 filed May 16, 2012.

TECHNICAL FIELD

The present disclosure relates to a battery cooling system and a battery rack applied to the same, and more particularly, to a battery cooling system having a Z-type cooling channel and a battery rack applied to the same.

The present disclosure claims priority to Korean Patent Application No. 10-2011-0052262 filed in the Republic of Korea on May 31, 2011 and the disclosures of which are incorporated herein by reference.

Further, the present disclosure claims priority to Korean Patent Application No. 10-2012-0051678 filed in the Republic of Korea on May 15, 2012 and the disclosures of which are incorporated herein by reference.

BACKGROUND ART

A battery rack having a plurality of battery modules loaded thereon includes a frame fabricated to have an appropriate hexahedron shape, a plurality of horizontal lathes dividing the frame into a plurality of levels and installing and fixing the battery modules therein, side, upper, lower and back panels respectively fixed to the sides, top, bottom and back of the frame, and a door or a front panel coupled to the front portion of the frame.

The battery rack is coupled to a predetermined cooling device in order to appropriately maintain temperature of the battery modules installed inside the rack. For coupling the cooling device, slits are formed in the upper and lower panels of the battery rack to allow a passage of a refrigerant such as air. The upper and lower panels are respectively connected to a refrigerant introduction duct and a refrigerant releasing duct. In this configuration, if a refrigerant forcibly blows into the refrigerant introduction duct or forcibly discharges from the refrigerant releasing duct, a refrigerant flows from the top to the bottom in the battery rack, and the refrigerant flowing from the top to the bottom passes through channels (slits) formed in the battery modules fixed in the lathes. In this process, the heat generated from the battery modules is absorbed by the refrigerant and discharged to the outside.

FIG. 1 is a schematic view showing a conventional battery cooling system to which the refrigerant flow as described above is applied.

Referring to FIG. 1, the conventional battery cooling system has a structure in which a cooling channel is formed in a battery rack 1, where battery modules 2 stacked in vertical direction are loaded, to pass through the battery modules 2 in the direction from the top to the bottom thereof (see an arrow direction in FIG. 1).

In this case, a temperature variation appears between the battery modules 2 loaded in different levels and the cooling channel elongates to cause relatively large differential pressure therebetween. The relatively large differential pressure works as a factor increasing the temperature variation of the battery modules 2 loaded in different levels.

Generally, the lifespan of a battery significantly deteriorates if internal temperature of the battery exceeds a specific temperature. Therefore, the temperature variation between the battery modules 2 loaded in different levels of the battery rack 1 negatively affects the operation performance and the lifetime of the battery modules 2.

Accordingly, a battery cooling system for minimizing a temperature variation between the battery modules loaded in a battery rack is in great demand.

Meanwhile, since a conventional battery rack is commonly placed at the inside of a car or in power transmission facilities, people or users are not likely to see the same. However, since facilities such as an energy storage system, an electric vehicle charge device, or the like are more likely to be placed in a house or at a place having a large floating population, a battery cooling system having a fine appearance, albeit a cooling device loaded thereon, is also in demand.

DISCLOSURE

Technical Problem

The present disclosure is designed in consideration of the problems of the prior art, and therefore it is an object of the present disclosure to provide a battery cooling system, which may minimize a temperature variation between battery modules loaded in different levels of a battery rack, and reduce the damages of an external design thereof, resulting from the formation of a channel.

Technical Solution

In order to accomplish the above object, the present disclosure provides a battery cooling system, including a main frame for defining a structure of a battery rack; a space dividing frame for dividing the inside of the main frame into a plurality of levels; a battery module located inside the main frame and supported by the space dividing frame; a pair of refrigerant guide plates respectively installed at the upper and lower ends of the battery module and installed to be inclined in the same direction with predetermined angles with respect to the upper and lower surfaces thereof; and side panels coupled to the sides of the main frame and having a channel slit formed in at least a part thereof.

The battery module may have heat-releasing slits formed in at least a part thereof.

The heat-releasing slits may be formed in at least the upper and lower sides of the battery module.

The battery module may include a first battery module loaded in a first level among the plurality of levels; and a second battery module loaded in a second level adjacent to the first level and located under the same.

The refrigerant guide plates may include: a first refrigerant guide plate provided in the upper portion of the first battery module; a second refrigerant guide plate provided in the lower portion of the first battery module; a third refrigerant guide plate provided in the upper portion of the second battery module; and a fourth refrigerant guide plate provided in the lower portion of the second battery module.

The first and second refrigerant guide plates may be placed in parallel to each other and the third and fourth refrigerant guide plates may be placed in parallel to each other.

The second refrigerant guide plate may be inclined opposite to the inclination of the third guide plate.

The first, second, third, and fourth refrigerant guide plates may be inclined in the same direction.

The first, second, third, and fourth refrigerant guide plates may be placed in parallel to each other.

The channel slits may be formed in both sides of the side panels in the width direction thereof.

The channel slits may include a first channel slit formed in an area corresponding to a space between the first refrigerant guide plate and the upper surface of the first battery module; a second channel slit formed in an area corresponding to a space between the second refrigerant guide plate and the lower surface of the first battery module; a third channel slit formed in an area corresponding to a space between the third refrigerant guide plate and the upper surface of the second battery module; and a fourth channel slit formed in an area corresponding to a space between the fourth refrigerant guide plate and the lower surface of the second battery module.

The battery cooling system may further include a cooling fan installed to at least one of the areas in which the first and second channel slits are formed, and to at least one of the areas in which the third and fourth channel slits are formed.

The battery cooling system may furthermore include an upper panel, a front panel, and a back panel coupled to the upper, front and back portions of the main frame, respectively.

The front panel may be a door hinged to the main frame.

Meanwhile, in order to accomplish the above object, the present disclosure provides a battery rack having a structure for cooling a battery module installed inside the rack, which may include a main frame for defining a structure of the battery rack; a space dividing frame for dividing the inside of the main frame into a plurality of levels; a pair of refrigerant guide plates respectively installed at the upper and lower ends of the battery module and installed to be inclined in the same direction to have predetermined angles with respect to the upper and lower surfaces thereof; and side panels coupled to the sides of the main frame and having a channel slit formed at least in a part thereof.

The refrigerant guide plates may include a first refrigerant guide plate provided in the upper portion of a first battery module loaded in a first level among the plurality of levels; a second refrigerant guide plate provided in the lower portion of the first battery module; a third refrigerant guide plate provided in the upper portion of a second battery module loaded in a second level adjacent to the first level and located under the same; and a fourth refrigerant guide plate provided in the lower portion of the second battery module.

The first and second refrigerant guide plates may be placed in parallel to each other and the third and fourth refrigerant guide plates may be placed in parallel to each other.

The second refrigerant guide plate may be inclined opposite to the inclination of the third guide plate.

The first, second, third, and fourth refrigerant guide plates may be inclined in the same direction.

The first, second, third, and fourth refrigerant guide plates may be placed in parallel to each other.

The channel slits may be formed on both sides of the side panels in the width direction thereof.

The channel slits may include a first channel slit formed in an area corresponding to a space between the first refrigerant guide plate and the upper surface of the first battery module; a second channel slit formed in an area corresponding to a space between the second refrigerant guide plate and the lower surface of the first battery module; a third channel slit formed in an area corresponding to a space between the third refrigerant guide plate and the upper surface of the second battery module; and a fourth channel slit formed in an area corresponding to a space between the fourth refrigerant guide plate and the lower surface of the second battery module.

The battery rack may further include a cooling fan to be installed to at least one of the areas in which the first and second channel slits are formed, and to at least one of the areas in which the third and fourth channel slits are formed.

The battery rack may furthermore include an upper panel, a front panel, and a back side panel coupled to the upper, front and back portions of the main frame, respectively.

Advantageous Effects

In accordance with an aspect of the present disclosure, since an inlet hole or an outlet hole of a refrigerant is formed between adjacent levels of a battery rack and makes a refrigerant flow diverge, length of a channel where the refrigerant flows decreases and a flow rate also decreases by half, thereby decreasing a temperature variation between the battery modules loaded in different levels and easing off the increase of a differential pressure.

According to another aspect of the present disclosure, since components required for cooling a battery module are installed inside the battery rack, and the inlet and outlet portions for a refrigerant are disposed at the side of the battery rack instead of the noticeably visible front or rear of the battery rack, there is an advantage in terms of appearance design.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Hereinafter, configuration of a battery cooling system 10 according to an embodiment of the present disclosure will be described in detail with reference to FIG. 2.

Figure 2:
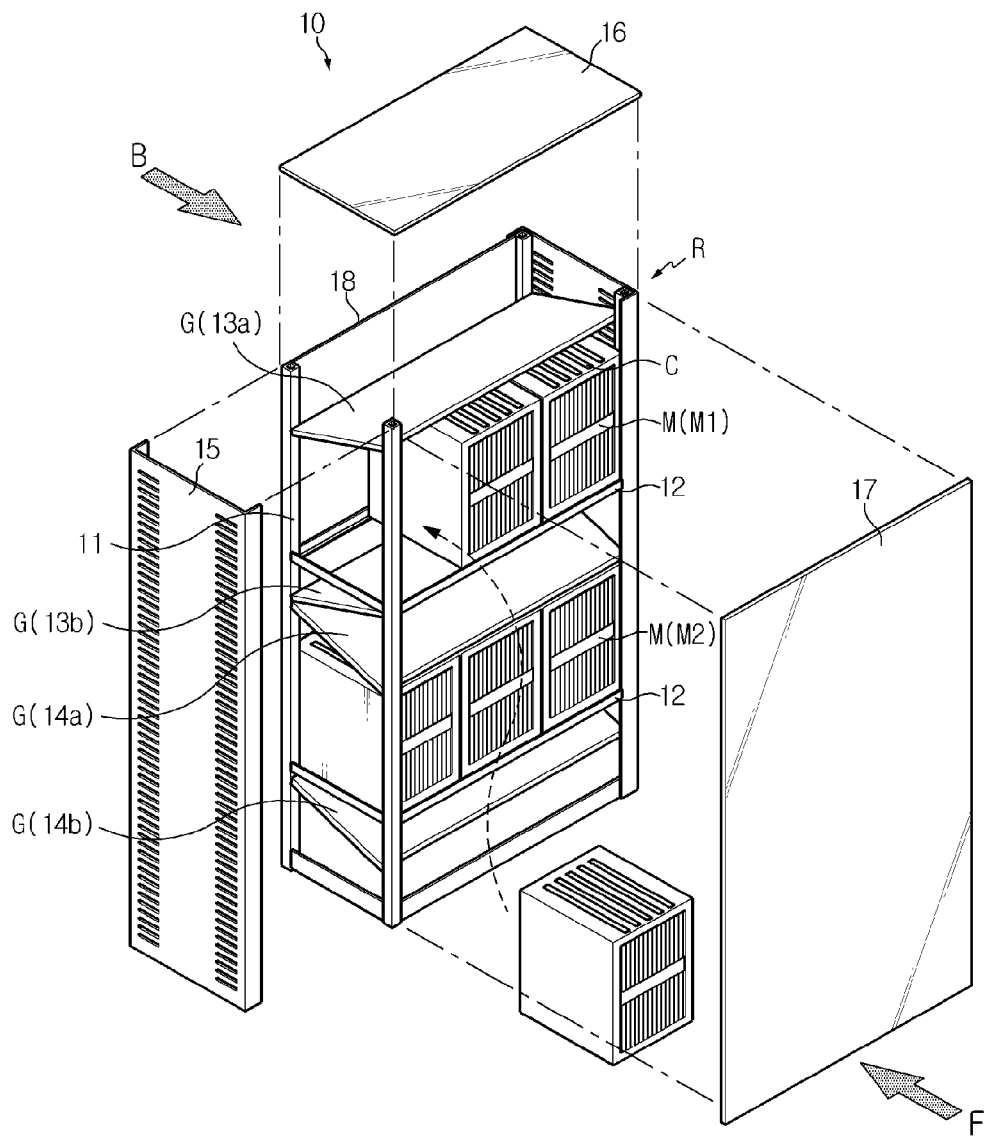
FIG. 2 is an exploded perspective view showing a battery cooling system according to an embodiment of the present disclosure.

FIG. 2 is an exploded perspective view showing a battery cooling system according to an embodiment of the present disclosure.

Referring to FIG. 2, the battery cooling system 10 according to an embodiment of the present disclosure includes a battery rack R and a battery module M.

The battery rack R is a structure on which the battery modules M are loaded, and includes a main frame 11, a space dividing frame 12, a refrigerant guide plate G, side panels 15, an upper panel 16, a front panel 17 and a back panel 18. The battery modules M include a first battery module M1 loaded in a first level of the battery rack R and a second battery module M2 loaded in a second level adjacent to the first level and located under the same, and each battery module M1, M2 has heat-releasing slits C formed at least in the upper and lower sides thereof.

The main frame 11 defines a structure of the battery rack R and provides an inner space in which the battery modules M are accommodated.

The space dividing frame 12 divides the inner space provided by the main frame 11 into a plurality of levels and supports the edge of the lower side of the battery modules M, so that the battery modules M may be loaded inside the main frame 11. Even though it is illustrated in the drawings that only two space dividing frames are provided and thus the battery modules M are loaded in two levels, the present disclosure is not limited thereto. That is, it is also possible that three or more space dividing frames 12 are provided, and thus the battery modules M are loaded in three or more levels, as being obvious in the art.

The refrigerant guide plates G are respectively installed at the upper and lower ends of the battery modules M and installed to be inclined in the same direction with predetermined angles with respect to the upper or lower surfaces thereof. A pair of refrigerant guide plates G is respectively installed in the upper and lower portions of the battery modules M loaded in the same level of the battery rack R. That is, the refrigerant guide plates G include first and second refrigerant guide plates 13a, 13b respectively provided at the upper and lower portions of the first battery module M1, and third and fourth refrigerant guide plates 14a, 14b respectively provided at the upper and lower portions of the second battery module M2.

Refrigerant guide plates G respectively provided at the upper and lower portions of the same battery module M may be installed in parallel to each other. That is, the first and second refrigerant guide plates 13a, 13b may be installed in parallel to each other, and the third and fourth refrigerant guide plates 14a, 14b may also be installed in parallel to each other.

However, the second refrigerant guide plate 13b and the third refrigerant guide plate 14a facing to each other are installed to be inclined in different directions. More particularly, the second refrigerant guide plate 13b and the third refrigerant guide plate 14a may be in a planar symmetric relation. In this case, one end of the second refrigerant guide plate 13b may contact one end of third refrigerant guide plate 14a in a space formed between battery modules M1, M2 loaded in adjacent levels in the vertical direction.

The side panels 15 are coupled to both sides of the main frame 11 and have channel slits 15a respectively formed in one side adjacent to the front surface (F direction) of the battery rack R and the other side adjacent to the back surface (B direction) of the battery rack R. The channel slits 15a are used as a passage for connecting the flow of a refrigerant such as air between the inner space where the battery module M is loaded and the outer space.

The upper panel 16, the front panel 17, and the back panel 18 are coupled to upper, front and back portions of the main frame 11, respectively. The main frame 11 may be coupled to the panels 16, 17, 18 by using various known methods including bolting, welding, or the like, without being limited thereto. Meanwhile, the front panel 17 may be a door hinged to the main frame 11.

Hereinafter, the principle of the battery cooling system 10 for cooling battery modules M loaded therein according to an embodiment of the present disclosure will be described in detail with reference to FIGS. 3 to 5.

Figure 3:
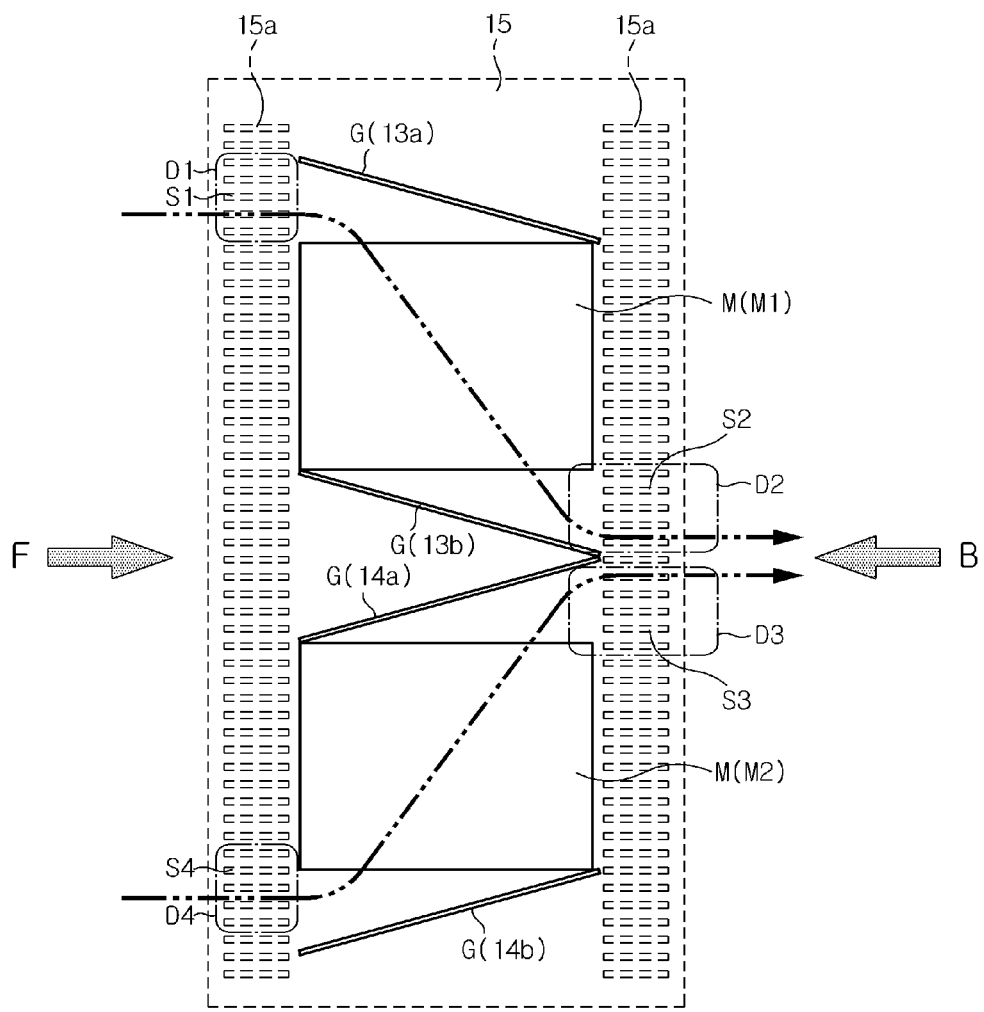
FIG. 3 is a side view showing a battery cooling system of FIG. 2, where refrigerant flow (inflow and outflow) is illustrated.
Figure 4:
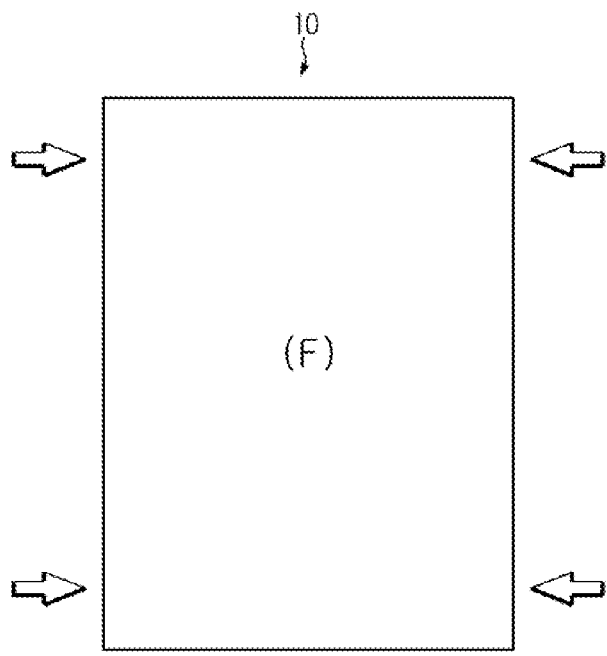
FIG. 4 is a schematic front view showing the battery cooling system of FIG. 2, where refrigerant flow (inflow) is illustrated.
Figure 5:
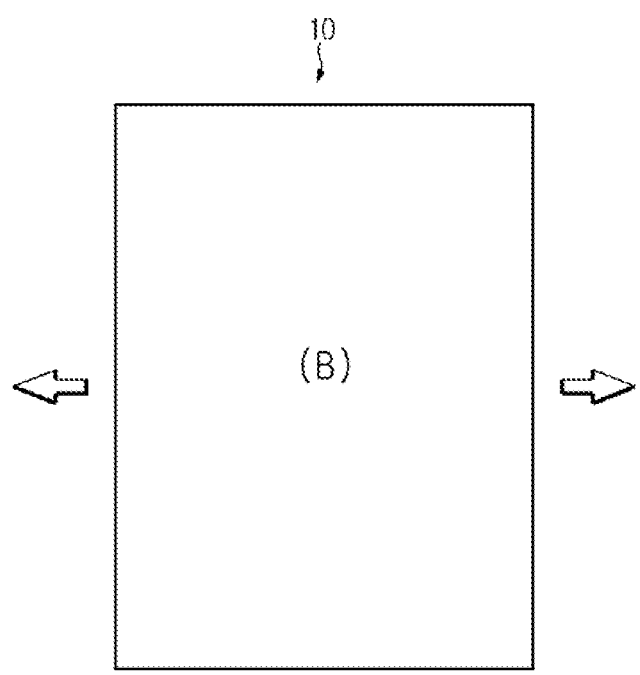
FIG. 5 is a schematic rear view showing the battery cooling system of FIG. 2, where refrigerant flow (outflow) is illustrated.

FIG. 3 is a side view showing the battery cooling system of FIG. 2, where refrigerant flow (inflow and outflow) is illustrated, FIG. 4 is a schematic front view showing the battery cooling system of FIG. 2, where refrigerant flow (inflow) is illustrated, and FIG. 5 is a schematic rear view showing the battery cooling system of FIG. 2, where refrigerant flow (outflow) is illustrated.

Referring to FIGS. 3 to 5, the channel slits 15a include a first channel slit S1, a second channel slit S2, a third channel slit S3 and a fourth channel slit S4, which are formed at different positions.

The first channel slit S1 is formed in an area D1 of the side panel 15, which corresponds to a space between the first refrigerant guide plate 13a and the first battery module M1, and the second channel slit S2 is formed in an area D2 of the side panel 15, which corresponds to a space between the second refrigerant guide plate 13b and the first battery module M1. Also, the third channel slit S3 is formed in an area D3 of the side panel 15, which corresponds to a space between the third refrigerant guide plate 14a and the second battery module M2, and the fourth channel slit S4 is formed in an area D4 of the side panel 15, which corresponds to a space between the fourth refrigerant guide plate 14b and the second battery module M2.

Figure 1:
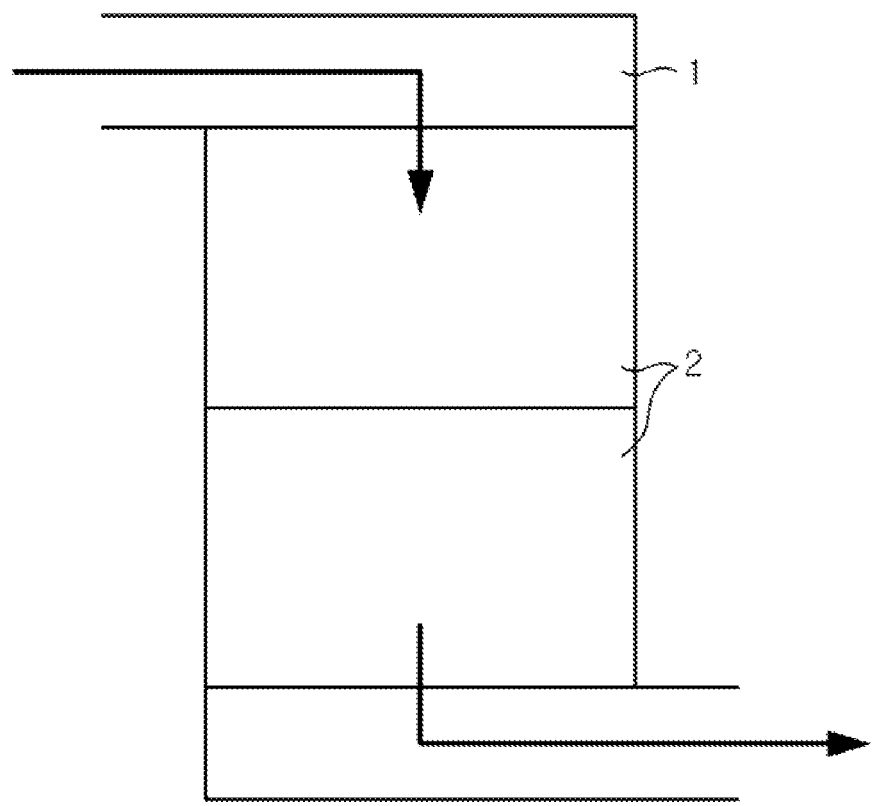
FIG. 1 is a schematic view showing a conventional battery cooling system.

The first channel slit S1 works as a passage of air serving as a refrigerant which flows from the outside of the battery rack R to the inside thereof. The refrigerant flowing into the battery rack is guided by the first refrigerant guide plate 13a and passes around the heat-releasing slits C (see FIG. 1) formed in the first battery module M1 to absorb the heat emitted from the heat-releasing slits C, which increases temperature of the refrigerant. The refrigerant with the increased temperature is guided by the second refrigerant guide plate 13b and completely discharges out of the battery rack R, thereby cooling the first battery module M1.

Meanwhile, if the first battery module M1 has the heat-releasing slits C at least in the upper and lower sides thereof, the refrigerant passes not only around the heat-releasing slits C but also through the first battery module M1, which may improve the cooling efficiency. That is, the refrigerant flows in the first battery module M1 through the heat-releasing slit C formed in the upper surface of the first battery module M1, absorbs the heat generated from a battery cell (not shown) and then discharges out through the heat-releasing slit C formed in the lower surface of the first battery module M1. The refrigerant discharging out from the first battery module M1 is guided by the second refrigerant guide plate 13b and completely discharges out from the battery rack R through the second channel slit S2, thereby cooling the first battery module M1.

Similarly, the fourth channel slit S4 works as a passage of a refrigerant which flows from the outside of the battery rack R to the inside thereof. The refrigerant flowing into the battery rack R is guided by the fourth refrigerant guide plate 14b to pass around the heat-releasing slits C (see FIG. 1) formed in the second battery module M2 and then guided by the third refrigerant guide plate 14a to discharge out of the battery rack R through the third channel slit S3.

Furthermore, if the second battery module M2 has the heat-releasing slits C at least in the upper and lower sides thereof, cooling efficiency may be improved by allowing a refrigerant to pass through the second battery module M2, similar to the case of the first battery module M1.

Meanwhile, a cooling fan (not shown) may be provided to at least one of the areas D1 and D2 and to at least one of the areas D3 and D4 so as to make forcible inflow or outflow of a refrigerant. When the cooling fan operates, the refrigerant forcibly moves in an approximate Z-shaped pattern along the arrow direction, and thus the battery modules M may be cooled efficiently. The cooling fan is preferably installed at the inner side of the side panel 15 in consideration of the appearance of the battery cooling system 10.

Hereinafter, the battery cooling system 20 according to another embodiment of the present disclosure will be described in detail with reference to FIGS. 6 to 8.

Figure 6:
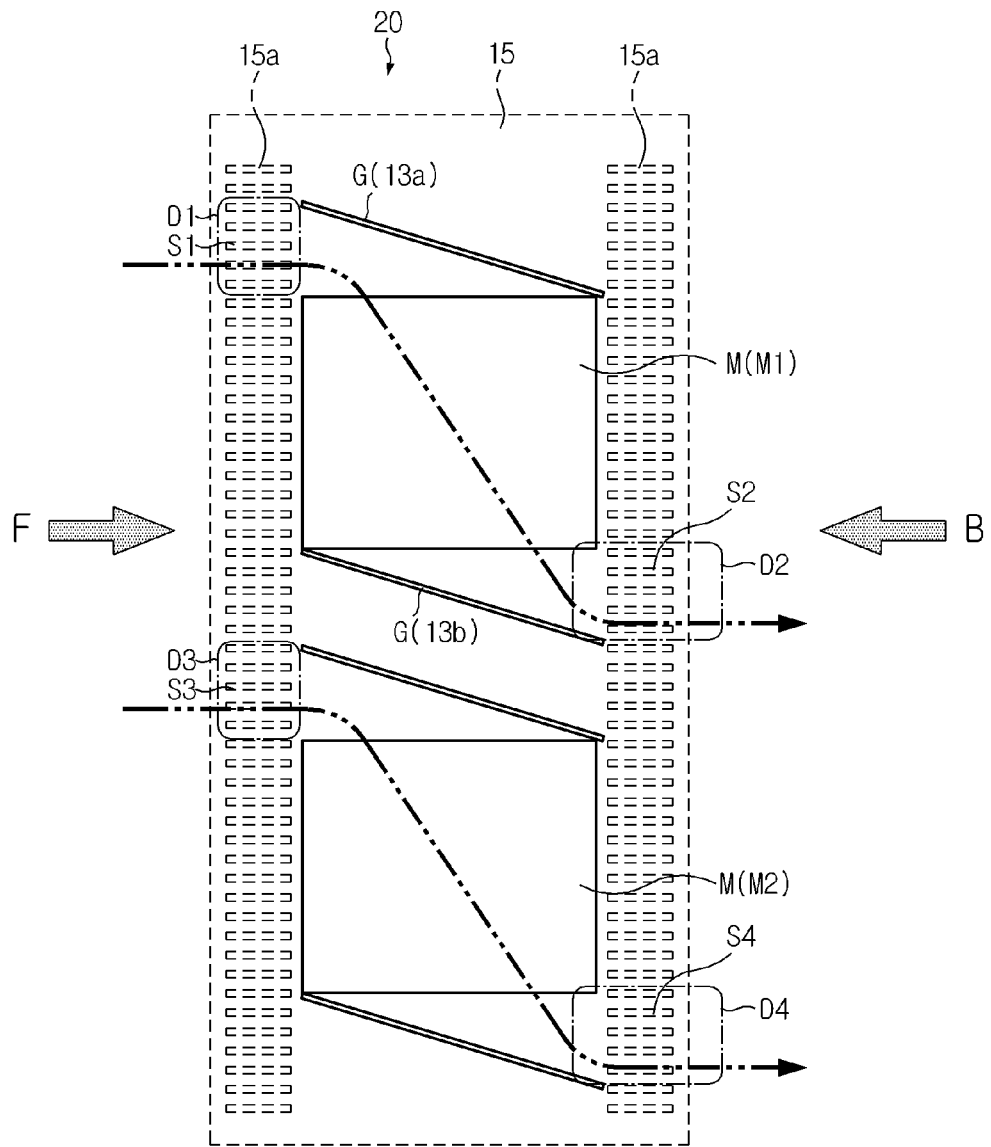
FIG. 6 is a side view showing the battery cooling system according to another embodiment of the present disclosure, where refrigerant flow (inflow and outflow) is illustrated.
Figure 7:
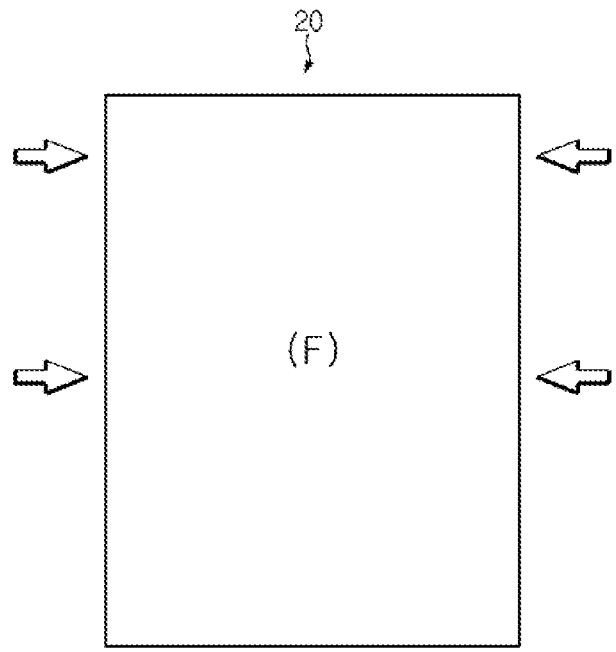
FIG. 7 is a schematic front view showing the battery cooling system according to another embodiment of the present disclosure, where refrigerant flow (inflow) is illustrated.
Figure 8:
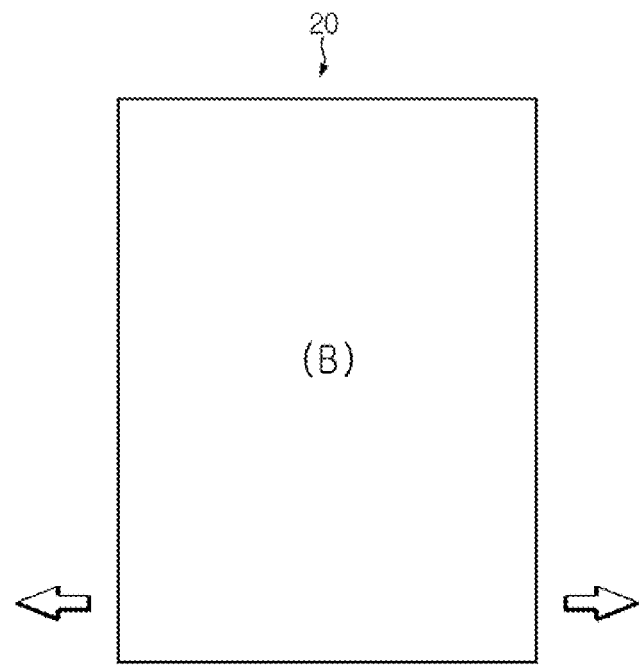
FIG. 8 is a schematic rear view showing the battery cooling system according to another embodiment of the present disclosure, where refrigerant flow (outflow) is illustrated.

FIG. 6 is a side view showing the battery cooling system according to another embodiment of the present disclosure, where refrigerant flow (inflow and outflow) is illustrated, FIG. 7 is a schematic front view showing the battery cooling system according to another embodiment of the present disclosure, where refrigerant flow (inflow) is illustrated, and FIG. 8 is a schematic rear view showing the battery cooling system according to another embodiment of the present disclosure, where a refrigerant flow (outflow).

Most components of the battery cooling system 20 of this embodiment are identical to those of the battery cooling system 10 according to the former embodiment of the present disclosure, except for the installation direction of the refrigerant guide plates G and the positions of the channel slits 15a through which a refrigerant flows in or out. In describing the battery cooling system 20 of this embodiment, repetitious description will be omitted, and the battery cooling system 20 of this embodiment will be described based on the installation direction of the refrigerant guide plates G and the positions of the channel slits 15a through which a refrigerant flows in or out.

Referring to FIGS. 6 to 8, the refrigerant guide plates G are respectively installed at the upper and lower ends of the battery modules M to be inclined in the same direction with predetermined angles with respect to the upper and lower surfaces thereof. The refrigerant guide plates G are installed in the upper and lower portions of the battery modules M loaded in the same level of the battery rack R. That is, the refrigerant guide plates G include first and second refrigerant guide plates 13a, 13b respectively provided in the upper and lower portions of the first battery module M1 and third and fourth refrigerant guide plates 14a, 14b respectively provided in the upper and lower portions of the second battery module M2. The refrigerant guide plates 13a, 13b, 14a, 14b are installed to be inclined in the same direction and the plates may also be entirely or partially installed to be parallel to each other.

Since the installing directions of the refrigerant guide plates G are varied, the refrigerant for cooling the second battery module M2 flows in the battery rack R through the third channel slit S3 formed in the area D3 and discharges out through the fourth channel slit S4 formed in the area D4, opposite to the former embodiment.

As described above, since the battery cooling system 10, 20 according to the present disclosure has the channel slits 15a between the levels of the battery rack R for inflow or outflow of a refrigerant to make air flow diverge, excellent cooling effects are presented. That is, since the battery cooling system 10, 20 according to the present disclosure decreases length of channel slits, it is possible to decrease a temperature variation between the battery modules M1, M2 loaded in different levels and ease off the increase of a differential pressure.

The foregoing exemplary embodiments and advantages are merely explanatory and are not to be construed as limiting the present inventive concept. Also, the description of the exemplary embodiments of the present disclosure is intended to be illustrative, and not to limit the scope of the claims, and many alternatives, modifications, and variations will be apparent to those skilled in the art.

What is claimed is:

1. A battery cooling system comprising:
a main frame for defining a structure of a battery rack;
a space dividing frame for dividing the inside of the main frame into a plurality of levels;
a battery module located inside the main frame and supported by the space dividing frame;
wherein the battery module includes:
a first battery module loaded in a first level among the plurality of levels;
a second battery module loaded in a second level adjacent to the first level and located under the same;
a first refrigerant guide plate provided in the upper portion of the first battery module;
a second refrigerant guide plate provided in the lower portion of the first battery module;
a third refrigerant guide plate provided in the upper portion of the second battery module; and
a fourth refrigerant guide plate provided in the lower portion of the second battery module wherein the first and second refrigerant guide plates are installed to be inclined in the same direction with predetermined angles with respect to the upper and lower surfaces of the first battery module and the third and fourth refrigerant guide plates are installed to be inclined in the same direction with predetermined angles with respect to the upper and lower surfaces of the second battery module; and
side panels coupled to the sides of the main frame and having a channel slit formed in at least a part thereof.

2. The battery cooling system according to claim 1, wherein the battery module has heat-releasing slits formed in at least a part thereof.

3. The battery cooling system according to claim 2, wherein the heat-releasing slits are formed in at least the upper and lower sides of the battery module.

4. The battery cooling system according to claim 1, wherein the first and second refrigerant guide plates are placed in parallel to each other and the third and fourth refrigerant guide plates are placed in parallel to each other.

5. The battery cooling system according to claim 4, wherein the second refrigerant guide plate is inclined opposite to the inclination of the third guide plate.

6. The battery cooling system according to claim 1, wherein the first, second, third, and fourth refrigerant guide plates are inclined in the same direction.

7. The battery cooling system according to claim 6, wherein the first, second, third, and fourth refrigerant guide plates are placed in parallel to each other.

8. The battery cooling system according to claim 1, wherein the channel slits are formed in both sides of the side panels in the width direction thereof.

9. The battery cooling system according to claim 8, wherein the channel slits include:
- a first channel slit formed in an area corresponding to a space between the first refrigerant guide plate and the upper surface of the first battery module;
- a second channel slit formed in an area corresponding to a space between the second refrigerant guide plate and the lower surface of the first battery module;
- a third channel slit formed in an area corresponding to a space between the third refrigerant guide plate and the upper surface of the second battery module; and
- a fourth channel slit formed in an area corresponding to a space between the fourth refrigerant guide plate and the lower surface of the second battery module.

10. The battery cooling system according to claim 9, further comprising a cooling fan installed to at least one of the areas in which the first and second channel slits are formed, and to at least one of the areas in which the third and fourth channel slits are formed.

11. The battery cooling system according to claim 1, further comprising an upper panel, a front panel, and a back panel coupled to the upper, front and back portions of the main frame, respectively.

12. The battery cooling system according to claim 11, wherein the front panel is a door hinged to the main frame.

13. A battery rack having a structure for cooling a battery module installed inside the rack, the rack comprising:
- a main frame for defining a structure of the battery rack;
- a space dividing frame for dividing the inside of the main frame into a plurality of levels;
- a first refrigerant guide plate provided in the upper portion of a first battery module loaded in a first level among the plurality of levels;
- a second refrigerant guide plate provided in the lower portion of the first battery module;
- a third refrigerant guide plate provided in the upper portion of a second battery module loaded in a second level adjacent to the first level and located under the same; and
- a fourth refrigerant guide plate provided in the lower portion of the second battery module wherein the first and second refrigerant guide plates are installed to be inclined in the same direction with predetermined angles with respect to the upper and lower surfaces of the first battery module and the third and fourth refrigerant guide plates are installed to be inclined in the same direction with predetermined angles with respect to the upper and lower surfaces of the second battery module; and
- side panels coupled to the sides of the main frame and having a channel slit formed at least in a part thereof.

14. The battery rack according to claim 13, wherein the first and second refrigerant guide plates are placed in parallel to each other and the third and fourth refrigerant guide plates are placed in parallel to each other.

15. The battery rack according to claim 14, wherein the second refrigerant guide plate is inclined opposite to the inclination of the third guide plate.

16. The battery rack according to claim 13, wherein the first, second, third, and fourth refrigerant guide plates are inclined in the same direction.

17. The battery rack according to claim 16, wherein the first, second, third, and fourth refrigerant guide plates are placed in parallel to each other.

18. The battery rack according to claim 13, wherein the channel slits are formed on both sides of the side panels in the width direction thereof.

19. The battery rack according to claim 18, wherein the channel slits include:
- a first channel slit formed in an area corresponding to a space between the first refrigerant guide plate and the upper surface of the first battery module;
- a second channel slit formed in an area corresponding to a space between the second refrigerant guide plate and the lower surface of the first battery module;
- a third channel slit formed in an area corresponding to a space between the third refrigerant guide plate and the upper surface of the second battery module; and
- a fourth channel slit formed in an area corresponding to a space between the fourth refrigerant guide plate and the lower surface of the second battery module.

20. The battery rack according to claim 19, further comprising a cooling fan to be installed to at least one of the areas in which the first and second channel slits are formed, and to at least one of the areas in which the third and fourth channel slits are formed.

21. The battery rack according to claim 13, further comprising an upper panel, a front panel, and a back side panel coupled to the upper, front and back portions of the main frame, respectively.

* * * * *